(12) United States Patent
Stettler, Jr.

(10) Patent No.: US 6,761,658 B1
(45) Date of Patent: Jul. 13, 2004

(54) FOUR MODE HYDRO-MECHANICAL TRANSMISSION

(75) Inventor: Werner Stettler, Jr., Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/368,654

(22) Filed: Feb. 14, 2003

(51) Int. Cl.[7] ............................................. F16H 47/04
(52) U.S. Cl. ......................................... 475/73; 475/80
(58) Field of Search ..................................... 475/73, 80

(56) References Cited

U.S. PATENT DOCUMENTS

| | | |
|---|---|---|
| 3,470,769 A | 10/1969 | Livezey |
| 3,990,327 A | 11/1976 | Margolin |
| 4,291,592 A | 9/1981 | Meyerle et al. |
| 4,306,467 A | 12/1981 | Pollman |
| 4,843,907 A | 7/1989 | Hagin et al. |
| 5,868,640 A | 2/1999 | Coutant |
| 5,890,981 A | 4/1999 | Coutant et al. |
| 5,911,645 A | 6/1999 | Wontner et al. |
| 5,976,046 A | 11/1999 | Larkin |
| 6,056,657 A | 5/2000 | Garnett |
| 6,338,689 B1 | 1/2002 | Pollman |

Primary Examiner—Dirk Wright

(57) ABSTRACT

An infinitely variable four mode hydro-mechanical transmission has a planetary system including three planetary gear sets, four clutches and a reverse brake. A first hydrostatic unit is geared to the second row ring of the planetary system. A second hydrostatic unit is geared to the planet carrier via a first clutch in Modes One and Four. The second hydrostatic unit is geared to the second row sun of the planetary system via a second clutch in Modes Two and Three. A third clutch connects the planet carrier to the output in Modes One and Two. A fourth clutch connects the second planetary row sun gear to the output in Modes Three and Four. A reverse brake is attached to the third planetary row. When the reverse brake is engaged and both the third and fourth clutches are disengaged the third row sun and thus the transmission output is driven in reverse.

27 Claims, 6 Drawing Sheets

FOUR MODE HYDRO-MECHANICAL TRANSMISSION

FIELD OF THE INVENTION

The present invention relates to a hydro-mechanical transmission having both mechanical and hydrostatic power branches and in particular to such a transmission for use in an agricultural tractor.

BACKGROUND OF THE INVENTION

The general problem in transferring power from engines to the ground, whether in agricultural tractors or road vehicles, is that different ratios are needed between the engine and wheels or tracks to match various operating conditions. Traditionally this has been done with discrete gear ratios. These ratios can be selected manually, as in conventional manual transmissions, or with operator controlled powershift transmissions. The ratios can also be controlled by the transmission as in automatic transmissions commonly found in automobiles. However, there are a limited number of discrete ratios available and the available ratios are not always optimum.

Accordingly, stepless or infinitely variable transmissions are desirable. Such transmissions are commonly embodied in hydrostatic drives, such as those found in self-propelled agricultural combines and lawn tractors. Another solution is electric drive as is used in railway locomotives and in some earth moving equipment. Both solutions have cost and efficiency disadvantages.

Another solution is the hydro-mechanical transmission. Hydro-mechanical transmissions are transmissions that combine a mechanical transmission with a hydrostatic unit. Although mechanical transmissions are generally more efficient and reliable than pure hydrostatic transmissions, they have the disadvantage of not being infinitely variable, as are the more expensive hydrostatic transmissions. Likewise, the hydrostatic transmissions have a major disadvantage in that they are less efficient than mechanical transmissions. Hydrostatic transmissions also generally require larger components, such as larger pumps and motors, as the transmission increases in capacity. The general advantage of hydro-mechanical transmissions over hydrostatic drives is that part of the power is transmitted mechanically, resulting in better efficiency than pure hydrostatic drives.

In order to satisfy space limitations, reduce cost, increase efficiency and provide an infinitely variable speed, hydro-mechanical transmissions have been developed that combine the best features of both transmissions. Hydro-mechanical transmissions are typically of a split power input type, where a hydrostatic unit and a mechanical transmission are driven in parallel by the vehicle engine. The hydrostatic output power is combined in the mechanical transmission with the split mechanical power input from the engine to produce hydro-mechanical output power in multiple power ranges. In each range, varying the stroke of the hydrostatic unit can infinitely vary the speed and torque.

However, previous attempts at using hydro-mechanical transmissions in agricultural tractors have had some disadvantages. Some hydrostatic transmissions require that the vehicle be at a standstill to shift between low and high range. Others have a high degree of complexity, while still others have the mode shift point in the field working range and the transmission efficiency at the shift point will be lower than the efficiency between mode shifts. Many hydro-mechanical transmissions also require additional gear sets to provide a reverse range.

In the known art there are basically three types of hydro-mechanical cycles. The first is the input coupled or torque split type. This type has one hydrostatic unit coupled or geared to the input of the transmission. The hydrostatic unit is generally a variable displacement unit. The other hydrostatic unit is coupled or geared to the torque splitting planetary. This unit is often a fixed displacement unit. The second is the output coupled or speed split. In this type of arrangement one hydrostatic unit is coupled to the output of the transmission and the other unit is coupled or geared to the torque splitting planetary. In practice both units are generally variable displacement units. The third is the four shaft or compound type. In this type neither hydrostatic unit is coupled to the transmission input or output. Instead both units are coupled or geared to the torque splitting planetary. There may be one or more than one planetary gear set involved.

Most hydro-mechanical transmissions use only one type of hydro-mechanical cycle. Of these, the most commonly used type is the input coupled or torque split type. These transmissions differ in the number of modes and in the arrangement of gears, but the hydro-mechanical cycle is the same. It has been known to utilize all three cycles in a single transmission. Known transmissions of this type have three modes of which the first is output coupled, the second is compound and the third is the non-regenerative part of the input coupled cycle. The advantage of this type of transmission is that both mode shifts are synchronous, zero torque shifts. The major disadvantage of such transmissions is that for a given power level the hydrostatic units are larger than in multiple mode input coupled transmissions.

Accordingly, there is a clear need in the art for a hydro-mechanical transmission that is compact and is capable of infinitely variable operation within its speed range without a significant drop in efficiency in the working ranges.

SUMMARY OF THE INVENTION

It is an object of the present invention to provide a hydro-mechanical transmission that is uniquely designed for optimal operation in an agricultural tractor.

It is a further advantage of the present invention to provide a transmission having a physical package similar to existing mechanical transmissions in length, enabling it to be readily integrated into existing tractor designs with minimal modification to the tractor. Many prior hydro-mechanical transmissions do not integrate a reverse gear set into the combining mechanical transmission but instead have a separate gear set before or after the combining mechanical transmission for shifting between forward and reverse directions. Such a design takes more space and may require the vehicle be brought to a stop before shifting between forward and reverse.

The four mode hydro-mechanical transmission disclosed herein has a planetary system including three planetary gear sets together with four clutches and a reverse brake to provide an infinitely adjustable speed change without an additional direction change gear set. A first hydrostatic unit is geared to the second row ring of the torque splitting planetary. A second hydrostatic unit is geared to the planet carrier via a first clutch and a gear pair in Modes One and Four. The second hydrostatic unit is geared to the second row sun of the torque splitting planetary via second clutch and a second pair of gears in Modes Two and Three. A third clutch connects the planet carrier to the output in Modes One and Two. A fourth clutch connects the second planetary row sun gear to the output in Modes Three and Four.

Additionally, there is a reverse brake attached to the third planetary row. This planetary row has six planets, three of which mesh with the third row sun, but not the ring, and three of which mesh with the ring but not the sun. Each planet which meshes with the sun gear also meshes with one of the planets which meshes with the ring gear. Accordingly, when the reverse brake is engaged and both the third and fourth clutches are disengaged the third row sun and thus the transmission output is driven in reverse.

The foregoing and other objects of the invention together with the advantages thereof over the known art which will become apparent from the detailed specification which follows are attained by a hydro-mechanical transmission comprising: an input shaft adapted to be connected to a rotational power source; an output shaft adapted to be connected to a load; a hydrostatic transmission including: a first hydrostatic element; a second hydrostatic element in fluid communication with the first hydrostatic element; a mechanical transmission having a planetary gear system including: a first clutch, a second clutch, a third clutch and a fourth clutch; a first element coupled to the input shaft and driven thereby; a second element in driving engagement with the first hydrostatic element; a third element selectively coupled to the second hydrostatic element by the first clutch; a fourth element selectively coupled to the second hydrostatic element by the second clutch, the fourth element drivingly coupled to the second element; a fifth element coupled to the output, the fifth element being selectively coupled to the third element by the third clutch, and selectively coupled to the fourth element by the fourth clutch; and, a sixth element selectively coupled to ground by a reverse brake wherein the fifth element and the output shaft are driven in reverse.

Other objects of the invention are attained by a hydro-mechanical transmission comprising: an input shaft adapted to be connected to a rotational power source; an output shaft adapted to be connected to a load; a hydrostatic transmission having first and second hydrostatic elements in fluid communication with one another; a mechanical transmission having a planetary system with three planetary gear sets, the mechanical transmission having a plurality of input elements with one input element coupled to the input shaft and continuously driven thereby and the other input elements selectively coupled to the second hydrostatic element by two clutches, the mechanical transmission combining power from the plurality of input elements into a single hydro-mechanical power output connected to the output shaft by two clutches; and, a reverse brake selectively coupled to a planetary gear set of the mechanical transmission; whereby the transmission has four forward speed modes and two reverse speed modes for infinitely variable speed adjustment between a full speed reverse and a full speed forward.

Still other objects of the invention are attained by a hydro-mechanical transmission comprising: an input shaft adapted to be connected to a rotational power source; an output shaft adapted to be connected to a load; a planetary gear system having a first planetary gear set, a second planetary gear set, and a third planetary gear set, each planetary gear set comprising a sun gear and a plurality of planet gears, each planet gear of the first planetary gear set being integrally formed with a planet gear of the second planetary gear set so as to rotate together, the planet gears of each planetary gear set being mounted on a common planet carrier, the second and third planetary gear sets each further comprising a ring gear; the input shaft drivingly connected to the sun gear of the first planetary gear set; the planet carrier selectively connected to the output by a third clutch; the sun gear of the second planetary gear set being selectively connected to the output by a fourth clutch; a second hydrostatic element selectively geared to the planet carrier via a first clutch and a gear pair, and selectively geared to the sun gear of the second planetary gear set via a second clutch and a second gear pair; a first hydrostatic element geared to the ring gear of the second planetary gear set, the first hydrostatic element being in fluid communication with the second hydrostatic element, the first and second hydrostatic elements being capable of selective variable displacement such that increasing the displacement of the first hydrostatic unit reduces the displacement and increases the speed of the second hydrostatic unit and vice versa; and, a reverse brake selectively connected to the ring gear of the third planetary gear set; wherein the first and third clutches are engaged, the displacement of the first hydrostatic element is increased to a maximum and the displacement of the second hydrostatic element is decreased to zero for a first output mode, the first clutch is disengaged, the second clutch is engaged, the displacement of the second hydrostatic element is increased in an opposite direction to that of mode one and the displacement of the first hydrostatic element is decreased until all parts of the planetary gear system are rotating at the same speed for a second output mode, the third clutch is disengaged, the fourth clutch is engaged and the displacement of the first hydrostatic element is increased to a maximum and the displacement of the second hydrostatic element is decreased to zero for a third output mode, the second clutch is disengaged, the first clutch is engaged, the displacement of the second hydrostatic element is increased to a maximum in a direction opposite to that of the third mode and the displacement of the first hydrostatic element is decreased to zero for a fourth output mode, and the reverse brake is selectively engaged in the first and second output modes to obtain reverse.

Still further objects of the invention are attained by an agricultural tractor comprising: an engine; drive wheels; a hydro-mechanical transmission driven by the engine and drivingly coupled to the drive wheels, the hydro-mechanical transmission comprising: an input shaft adapted to be connected to the engine; an output shaft adapted to be connected to the drive wheels; a hydrostatic transmission including: a first hydrostatic element, a second hydrostatic element in fluid communication with the first hydrostatic element; a mechanical transmission having a planetary gear system including: a first clutch, a second clutch, a third clutch and a fourth clutch; a first element coupled to the input shaft and driven thereby; a second element in driving engagement with the first hydrostatic element; a third element selectively coupled to the second hydrostatic element by the first clutch; a fourth element selectively coupled to the second hydrostatic element by the second clutch, the fourth element drivingly coupled to the second element; a fifth element coupled to the output, the fifth element being selectively coupled to the third element by the third clutch, and selectively coupled to the fourth element by the first clutch; and, a sixth element selectively coupled to ground by a reverse brake wherein the fifth element and the output shaft are driven in reverse; whereby the transmission has four forward speed modes and two reverse speed modes for infinitely variable speed adjustment between a full speed reverse and a full speed forward.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
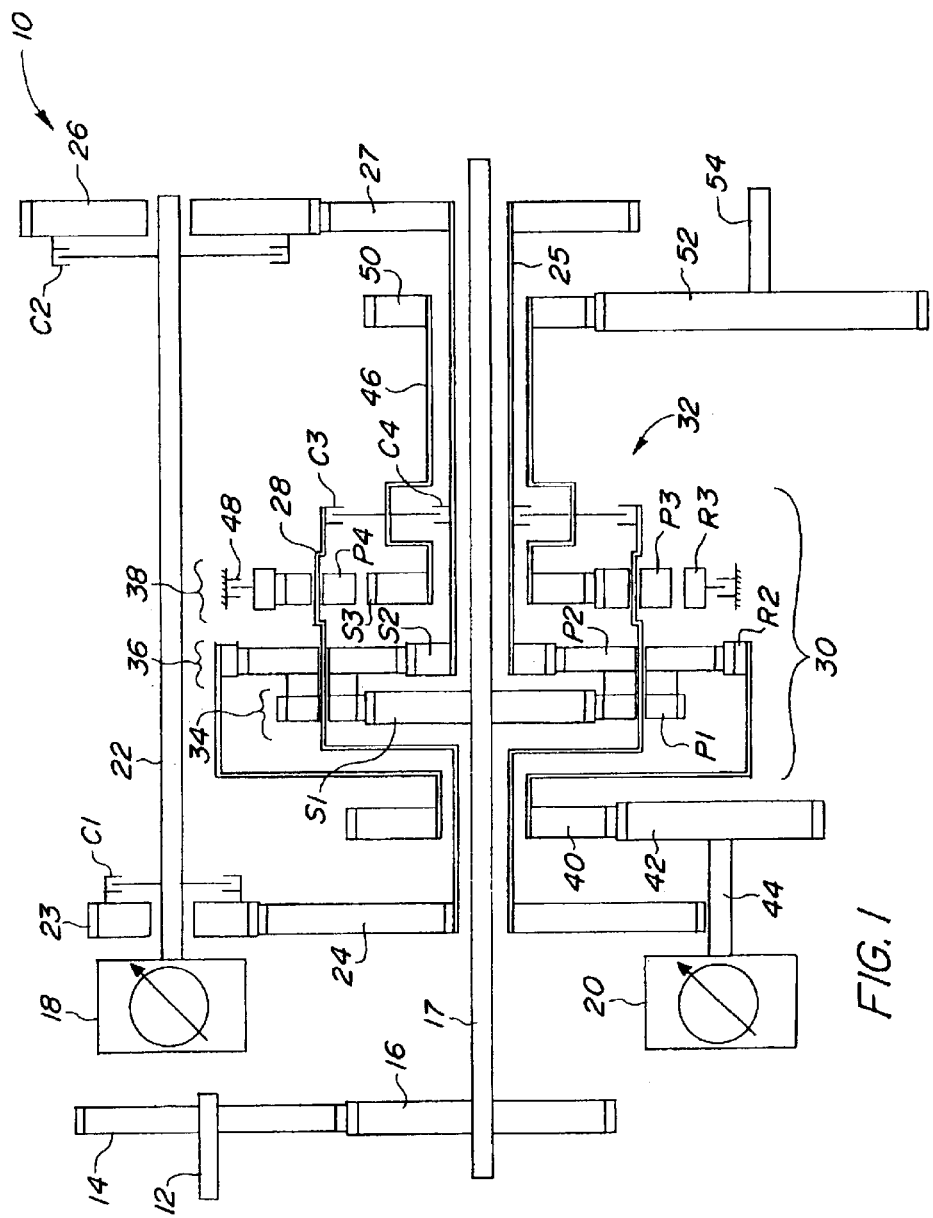
FIG. 1 is a schematic representation of the hydro-mechanical transmission of the present invention.

The hydro-mechanical transmission of the present invention is shown schematically in FIG. 1 and designated generally by the numeral 10. The transmission 10 has an input shaft 12 adapted to be coupled to and driven by an engine (not shown) or other source of rotational power. The transmission has a pair of hydrostatic units 18 and 20. The units are coupled hydraulically by lines (not shown) to form a hydrostatic transmission. Both the units 18 and 20 are variable displacement components.

The transmission 10 includes a combining mechanical transmission 30 having planetary system 32. The planetary system 32 includes three planetary gear sets 34, 36, and 38. The planetary gear sets have a common planet gear carrier 28 that carries the integral planet gears P1 and P2 of planetary gear sets 34 and 36 respectively. The carrier 28 also carries the planet gears P3 and P4 of the reversing planetary gear set 38. The planet gears P1 and P2 are integrally formed and thus rotate together. The planet gears P2 mesh with a ring gear R2. The ring gear R2 is formed integrally with a gear 40. The gear 40 is driven by the drive gear 42 on a hydrostatic unit output shaft 44. Thus the ring gear R2 serves as a hydrostatic power input element.

The transmission input shaft 12 also drives a sun gear S1 of the first planetary gear set 34 by way of gears 14 and 16 and shaft 17 whereby the sun gear S1 is the mechanical power input element. Sun gear S1 meshes with the planet gear P1. The planetary gear set 36 includes a sun gear S2 meshing with the planet gears P2.

Clutches, C3 and C4, selectively couple elements of the planetary system to the mechanical transmission output shaft 46. The clutch C3 is engagable to couple the carrier 28 to the output shaft 46 for a low speed forward range. The clutch C4 is engagable to couple the sun gear S2 to the output shaft 46 for a high speed forward range.

The output 22 of hydrostatic unit 18 is selectively coupled to the planet carrier 28 by way of clutch C1 and gears 23 and 24. Output 22 is also selectively coupled to a shaft 25 and sun gear S2 by way of clutch C2 and gears 26 and 27.

The output shaft 46 is fixed to the sun gear S3. Ring gear R3 is selectively grounded by the reverse brake 48. This stops the rotation of the ring gear R3 and causes the sun gear S3 to rotate in the reverse direction for a reverse speed range. When the reverse brake 48 is applied and both clutches C3 and C4 are disengaged, the sun gear S3 drives the output shaft 46.

The output shaft 46 of the mechanical transmission is integrally formed with a gear 50 that in turn meshes with a gear 52 on the offset shaft 54. The offset shaft is coupled to the differential drive shaft (not shown) of the tractor to couple the hydro-mechanical transmission 10 to a load.

The transmission 10 operates in four modes. Each mode uses a separate path through the mechanical transmission 30 to the output shaft 46 resulting in unique gear ratios for each range.

Mode One Operation

Figure 2:
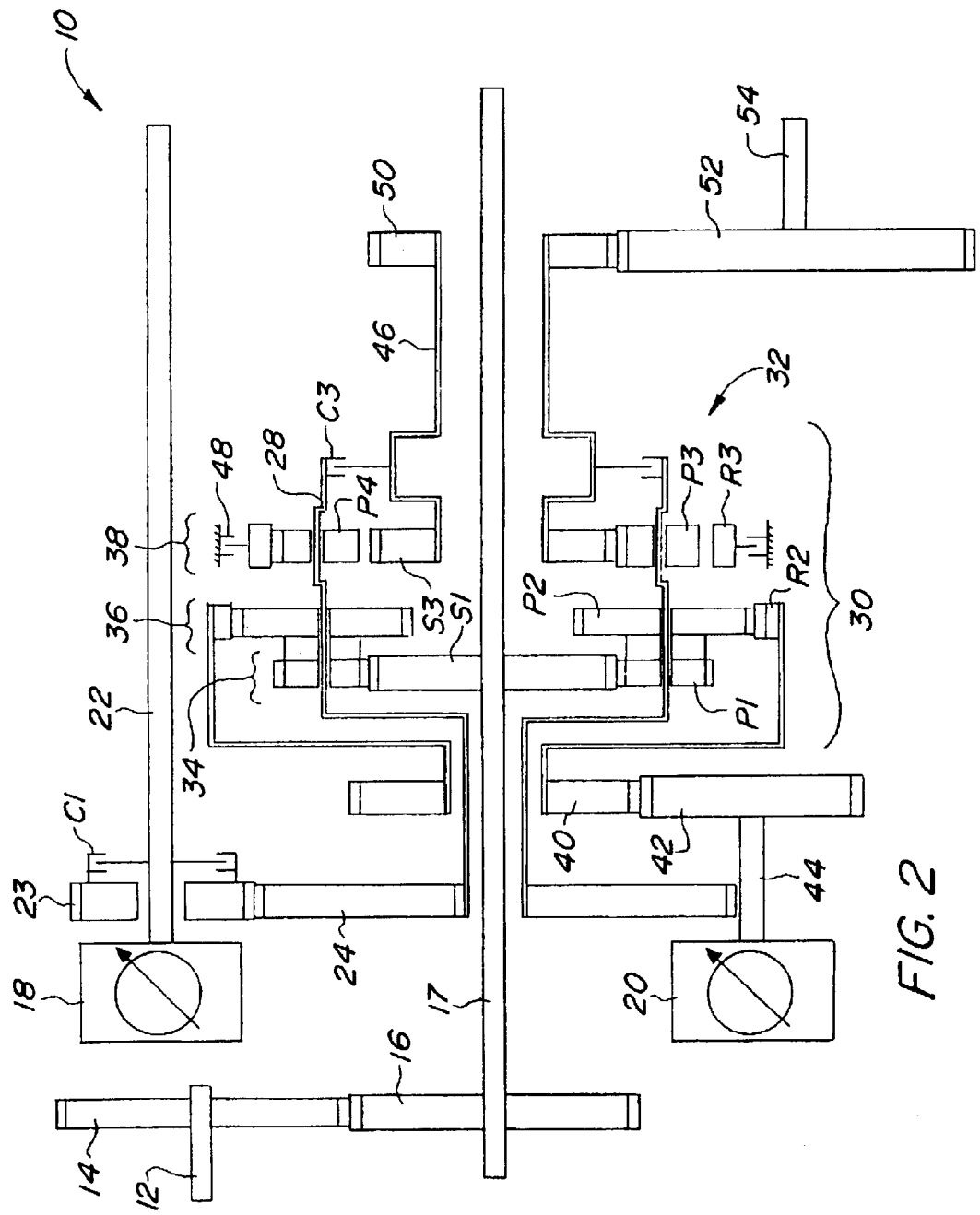
FIG. 2 is a schematic representation of the hydro-mechanical transmission of the present invention operating in Mode One.

In Mode One clutches C1 and C3 are engaged as shown in FIG. 2. At zero output speed the hydrostatic unit 18 is at maximum displacement and because it is connected to the output by way of clutches C1 and C3, its speed is zero. At zero output speed the hydrostatic unit 20 is at a relatively high speed. In order for the transmission output to rotate, the displacement of hydrostatic unit 20 is increased causing it to pump fluid to hydrostatic unit 18, thereby causing hydrostatic unit 18 and the transmission output to rotate. When hydrostatic unit 20 reaches its maximum displacement it remains at maximum displacement, while the displacement of hydrostatic unit 18 is decreased. When the displacement of hydrostatic unit 18 reaches zero, it blocks the flow of fluid to and from hydrostatic unit 20 thus stopping rotation of hydrostatic unit 20 and ring gear R2. With hydrostatic unit 20 at zero speed and hydrostatic unit 18 at zero displacement, the hydrostatic power is zero and all power is transmitted mechanically. At this point to shift to Mode Two clutch C1 is disengaged and clutch C2 is engaged. Since hydrostatic unit 18 is at zero displacement, the nominal torque is zero. The gearing to clutches C1 and C3 is chosen such that there is no relative speed of the clutch elements of the clutch C2 at the Mode One to Mode Two shift. Because of the synchronous and zero torque condition, clutches C1 and C2 can be either clutches with conventional friction discs or collar or dog shifters of the type more commonly used in manually shifted transmissions. Reverse is obtained in Mode One by engaging the reverse brake 48 and disengaging the clutch C3 allowing the sun gear 53 and thus the transmission output to be driven in reverse.

Mode Two Operation

Figure 3:
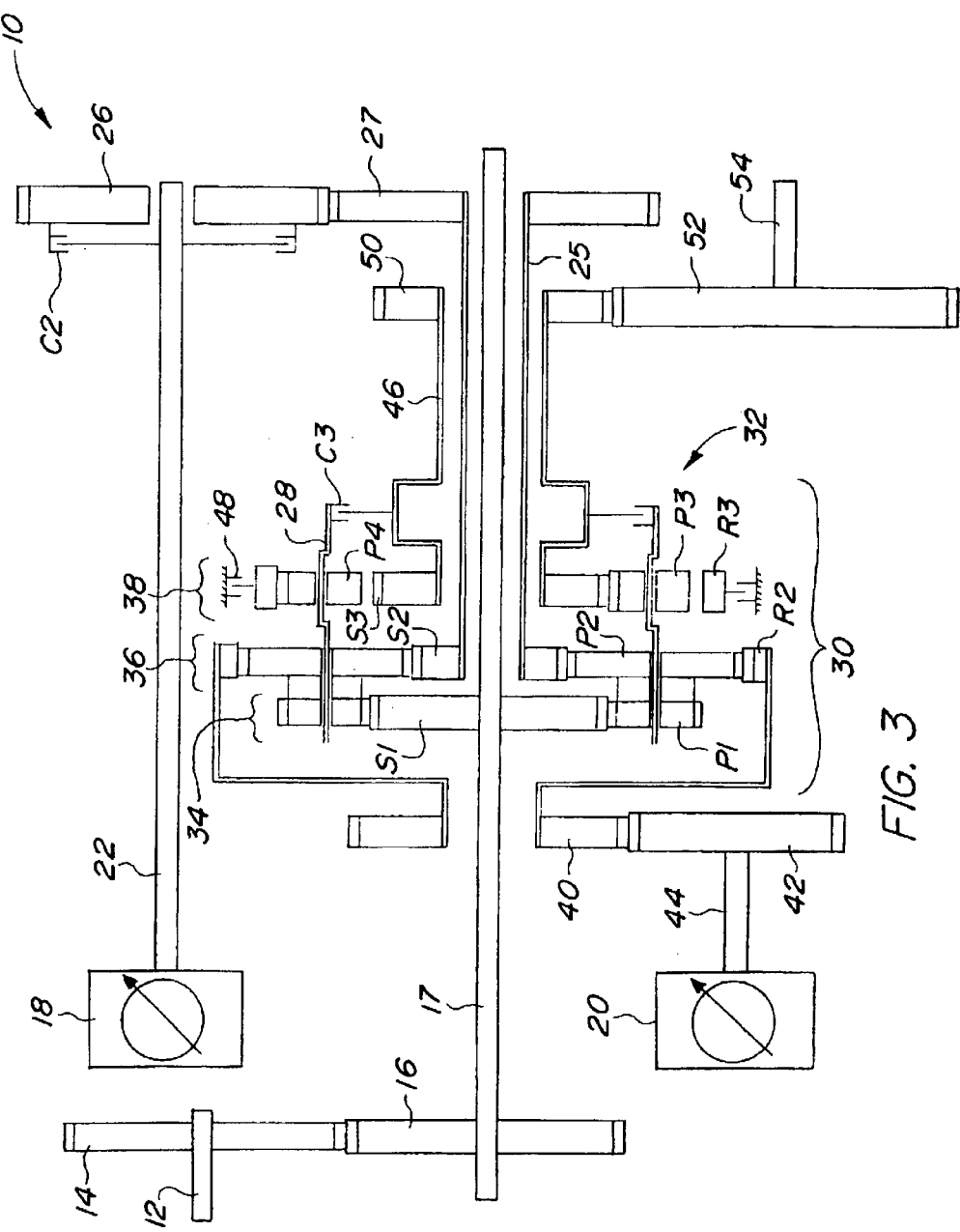
FIG. 3 is a schematic representation of the hydro-mechanical transmission of the present invention operating in Mode Two.

As shown in FIG. 3 clutches C2 and C3 are engaged. At minimum output speed in Mode Two hydrostatic unit 18 is at zero displacement and high speed, while the displacement of hydrostatic unit 20 is at maximum and zero speed. In order to increase output speed the displacement of hydrostatic unit 18 is increased, but in a direction opposite of the direction used in Mode One. This causes the speed of hydrostatic unit 18 to decrease and the speed of hydrostatic unit 20 to increase. After the displacement of hydrostatic unit 18 reaches maximum it is held at maximum while the displacement of hydrostatic unit 20 is decreased. In this mode the displacement of hydrostatic unit 20 is decreased until the speed of the ring gear R2 is the same as the sun gear S1. In general the displacement of hydrostatic unit 20 will be approximately 60–65% of the displacement of hydrostatic unit 18 at the Mode Two to Mode Three shift, but this value depends on the specific gear ratios chosen. At this point clutch C4 can be engaged and clutch C3 disengaged. Since the torque splitting planetary has all of its elements rotating at the same speed the Mode Two to Mode Three shift will also be synchronous inasmuch as the C4 clutch has all of its elements rotating at the same speed. These clutches will however be transmitting torque so C4 must be engaged before C3 is disengaged, otherwise power flow would be interrupted. To obtain reverse in Mode Two the reverse brake 48 is engaged and clutch C3 is disengaged allowing the sun gear 53 and thus the transmission output to be driven in reverse.

Mode Three Operation

Figure 4:
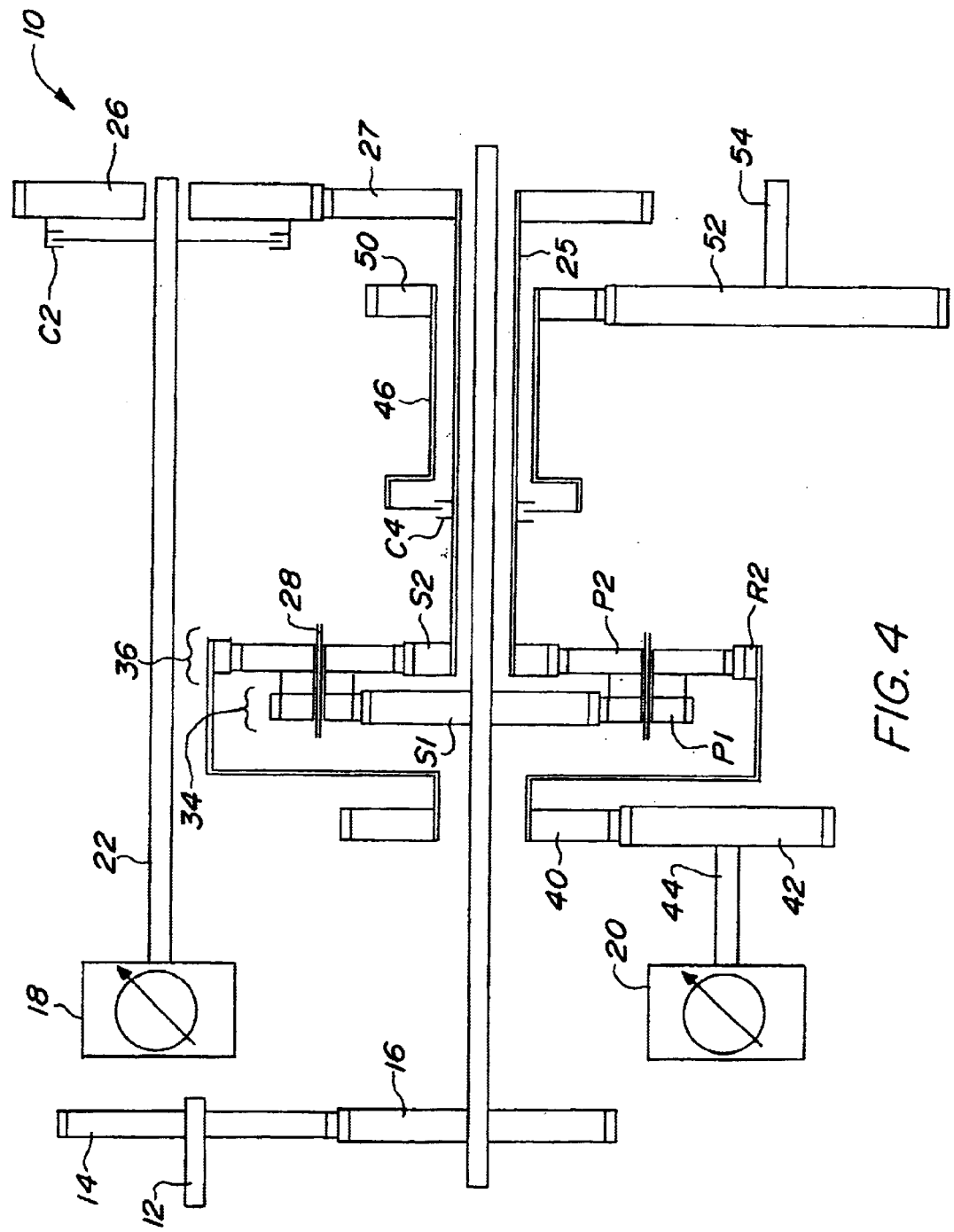
FIG. 4 is a schematic representation of the hydro-mechanical transmission of the present invention operating in Mode Three.

Referring now to FIG. 4 it will be seen that clutches C2 and C4 are engaged. At minimum output in Mode Three the displacement and speed of both hydrostatic units 18 and 20 will be the same as at maximum output speed in Mode Two. To increase the output speed in Mode Three, the displacement of hydrostatic unit 20 is increased to maximum. Then while hydrostatic unit 20 is held at maximum displacement, the displacement of hydrostatic unit 18 is decreased to zero, further increasing the output speed. At this point hydrostatic unit 18, being at zero displacement, blocks fluid flow to and from hydrostatic unit 20 thereby stopping the rotation of hydrostatic unit 20. In order to shift from Mode Three to Mode Four clutch C2 is disengaged and clutch C1 is engaged. The torque and speeds of these clutches are the same as at the Mode One to Mode Two shift. Also all power is transmitted mechanically as at the Mode One to Mode Two shift. Reverse is not available in Mode Three.

Mode Four Operation

Figure 5:
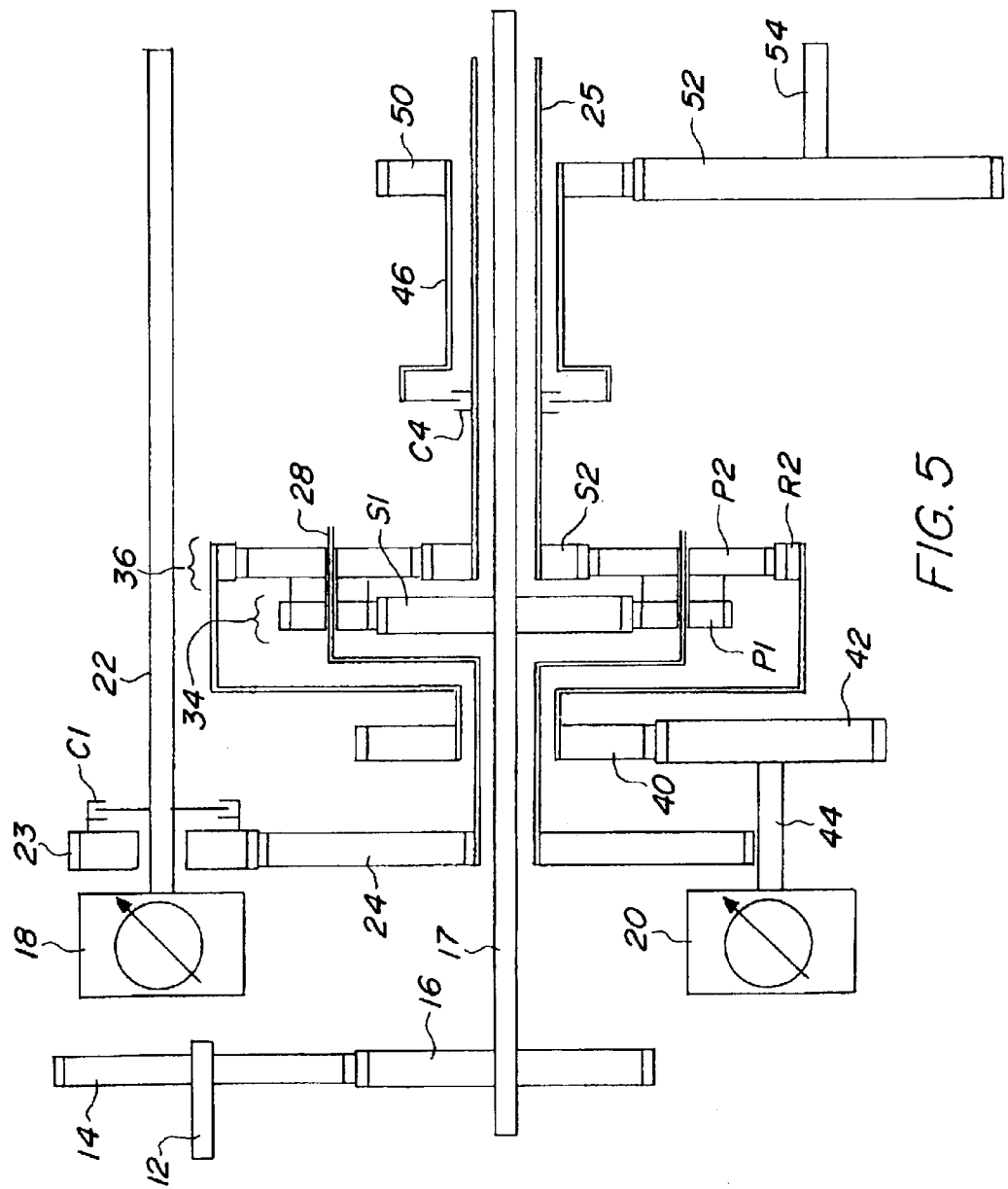
FIG. 5 is a schematic representation of the hydro-mechanical transmission of the present invention operating in Mode Four; and, FIG. 6 is a line graph showing the relationship between displacement of the hydrostatic units and ground speed.

With reference now to FIG. 5 it will be seen that clutches C1 and C4 are engaged. At minimum output speed in Mode Four the displacement and speed of both hydrostatic units 18 and 20 are the same as at maximum output speed in Mode Three. To increase output speed in Mode Four the displacement of hydrostatic unit 18 is increased to maximum, but in the opposite direction to that of Modes Two and Three. While hydrostatic unit 18 is held at maximum displacement, the displacement of hydrostatic unit 20 is reduced to zero. At this point the speed of hydrostatic unit 18 is zero, hydrostatic power is zero and all power is transmitted mechanically. Reverse is not available in Mode Four.

Figure 6:
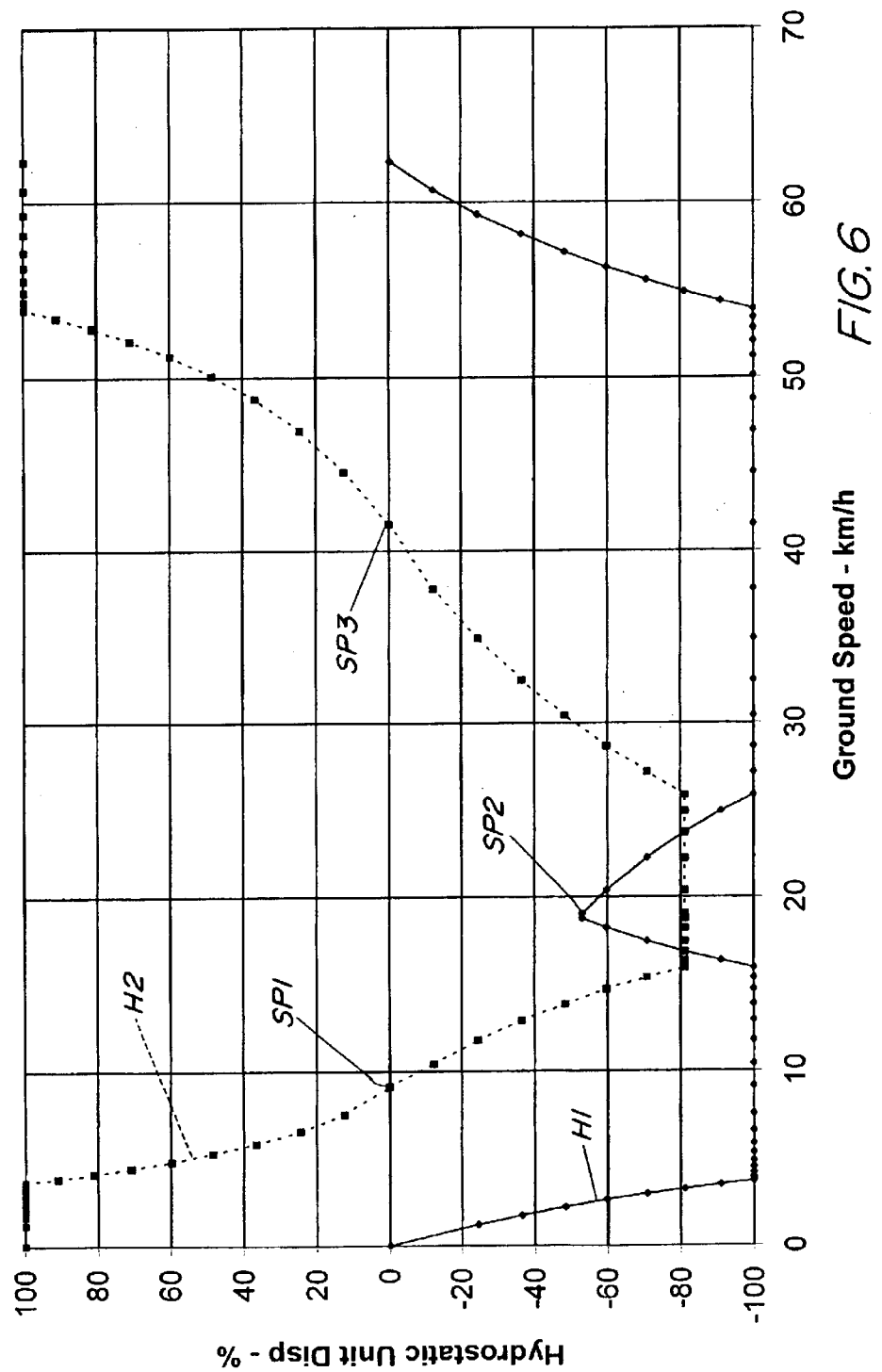

FIG. 6 illustrates the relative percent displacements of the hydrostatic units 18 and 20 with respect to ground speed. The line designated at H1 represents the percent displacement of hydrostatic unit 20, while the line designated at H2 represents the percent displacement of hydrostatic unit 18. The Mode One to Mode Two shift point is designated SP1. The Mode Two to Mode Three shift point is designated SP2. The Mode Three to Mode Four shift point is designated SP3. The graph of FIG. 6 is provided to illustrate the displacement of the hydrostatic units with respect to ground speed in one preferred embodiment of the invention. Those having skill in the art will recognize that the ground speed values are dependent upon a number of variables such as gear size, tire size and engine rpm.

The hydromechanical transmission disclosed above differs from prior art transmissions in that it has four forward modes and two reverse modes and uses two of the three hydro-mechanical cycles. The first mode's forward and reverse are output coupled. The second mode's forward and reverse are compound. The third mode forward is output coupled and the fourth mode forward is compound. This results in three forward output ratios where there is zero hydrostatic power. They are at the Mode One to Mode Two shift point, the Mode Three to Mode Four shift point and at maximum transmission output ratio. Since the hydrostatic power is low near these operating points the result is good efficiency near these operating points. Also the transmission disclosed above uses only four clutches and one brake for four modes forward and two modes reverse. By comparison previously known multi-cycle transmissions have used a minimum of five clutches and one brake to obtain three modes forward and three modes reverse. Accordingly, the transmission of the present disclosure has an advantage in cost and simplicity of construction. The present transmission also solves the problem of large hydrostatic size by using four modes. The present transmission can use hydrostatic units of the same size as much less powerful transmissions. Further, the present transmission solves the problem of low efficiency at a shift point in the field working range. While the transmission disclosed herein does make a shift at about 9 km/h, which is a commonly used working speed all power is transmitted mechanically so there is little or no efficiency penalty at this point. There is a drop in efficiency after the Mode Two to Mode Three shift but this occurs at about 20 km/h which is a speed not commonly used for field work or transport, so the impact is not great. Even at this point the hydrostatic power is less than 50% so the efficiency is still relatively good.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and various modifications as are suited to the particular use contemplated. All such modifications and variations are within the scope of the invention as determined by the appended claims when interpreted in accordance with the breadth to they are fairly and legally entitled.

The embodiments of the invention in which an exclusive property or privilege is claimed are defined as follows:

1. A hydro-mechanical transmission comprising:
   an input shaft adapted to be connected to a rotational power source;
   an output shaft adapted to be connected to a load;
   a hydrostatic transmission including:
      a first hydrostatic element;
      a second hydrostatic element in fluid communication with the first hydrostatic element;
   a mechanical transmission having a planetary gear system including:
      a first clutch, a second clutch, a third clutch and a fourth clutch;
      a first element coupled to the input shaft and driven thereby;
      a second element in driving engagement with the first hydrostatic element;
      a third element selectively coupled to the second hydrostatic element by the first clutch;
      a fourth element selectively coupled to the second hydrostatic element by the second clutch, the fourth element drivingly coupled to the second element;
      a fifth element coupled to the output, the fifth element being selectively coupled to the third element by the third clutch, and selectively coupled to the fourth element by the fourth clutch; and, a sixth element selectively coupled to ground by a reverse brake wherein the fifth element and the output shaft are driven in reverse.

2. The hydromechanical transmission as defined by claim 1 wherein the planetary system has three planetary gear sets.

3. The hydro-mechanical transmission as defined by claim 2 wherein first and second planetary gear sets have first and second planet gears respectively which are fixed to one another and thereby rotate together.

4. The hydro-mechanical transmission as defined by claim 2 wherein the three planetary gear sets have a common planet gear carrier.

5. The hydro-mechanical transmission as defined by claim 4 wherein the planet gear carrier is the third element that is selectively coupled to the second hydrostatic element by the first clutch.

6. The hydro-mechanical transmission as defined by claim 4 wherein the three planetary gear sets include first planet gears meshing with a first sun gear, second planet gears meshing with a second sun gear and a first ring gear and wherein the first and second planet gears are fixed to one another and thereby rotate at the same speed.

7. The hydro-mechanical transmission as defined by claim 6 wherein the first sun gear is the first element and the first ring gear is the second element.

8. The hydro-mechanical transmission as defined by claim 6 wherein a third sun gear is the fifth element and is fixed to the output shaft.

9. The hydro-mechanical transmission as defined by claim 8 wherein a second ring gear is the sixth element.

10. A hydro-mechanical transmission comprising:
an input shaft adapted to be connected to a rotational power source;
an output shaft adapted to be connected to a load;
a hydrostatic transmission having first and second hydrostatic elements in fluid communication with one another;
a mechanical transmission having a planetary system with three planetary gear sets, the mechanical transmission having a plurality of input elements with one input element coupled to the input shaft and continuously driven thereby and the other input elements selectively coupled to the second hydrostatic element by two clutches, the mechanical transmission combining power from the plurality of input elements into a single hydro-mechanical power output connected to the output shaft by two clutches; and,
a reverse brake selectively coupled to a planetary gear set of the mechanical transmission,
whereby the transmission has four forward speed modes and two reverse speed modes for infinitely variable speed adjustment between a full speed reverse and a full speed forward.

11. The hydro-mechanical transmission as defined by claim 10 wherein first and second planetary gear sets have first and second planet gears respectively which are fixed to one another and thereby rotate together.

12. The hydro-mechanical transmission as defined by claim 10 wherein the three planetary gear sets have a common planet gear carrier.

13. The hydro-mechanical transmission as defined by claim 12 wherein the planet gear carrier is one of the plurality of input elements that is selectively coupled to the first and second hydrostatic elements.

14. The hydro-mechanical transmission as defined by claim 12 wherein the three planetary gear sets include first planet gears meshing with a first sun gear, second planet gears meshing with a second sun gear and a first ring gear and wherein the first and second planet gears are fixed to one another and thereby rotate at the same speed.

15. The hydro-mechanical transmission as defined by claim 14 wherein the second sun gear is one of the plurality of input elements selectively coupled to the second hydrostatic element.

16. The hydro-mechanical transmission as defined by claim 14 wherein a third sun gear of a third planetary gear set is fixed to the output shaft.

17. The hydro-mechanical transmission as defined by claim 16 wherein a second ring gear of the third planetary gear set is selectively coupled to ground by the reverse brake.

18. A hydro-mechanical transmission comprising:
an input shaft adapted to be connected to a rotational power source;
an output shaft adapted to be connected to a load;
a planetary gear system having a first planetary gear set, a second planetary gear set, and a third planetary gear set, each planetary gear set comprising a sun gear and a plurality of planet gears, each planet gear of the first planetary gear set being integrally formed with a planet gear of the second planetary gear set so as to rotate together, the planet gears of each planetary gear set being mounted on a common planet carrier, the second and third planetary gear sets each further comprising a ring gear;
the input shaft drivingly connected to the sun gear of the first planetary gear set;
the planet carrier selectively connected to the output by a third clutch;
the sun gear of the second planetary gear set being selectively connected to the output by a fourth clutch;
a second hydrostatic element selectively geared to the planet carrier via a first clutch and a gear pair, and selectively geared to the sun gear of the second planetary gear set via a second clutch and a second gear pair;
a first hydrostatic element geared to the ring gear of the second planetary gear set, the first hydrostatic element being in fluid communication with the second hydrostatic element, the first and second hydrostatic elements being capable of selective variable displacement such that increasing the displacement of the first hydrostatic unit reduces the displacement and increases the speed of the second hydrostatic unit and vice versa; and,
a reverse brake selectively connected to the ring gear of the third planetary gear set;
wherein the first and third clutches are engaged, the displacement of the first hydrostatic element is increased to a maximum and the displacement of the second hydrostatic element is decreased to zero for a first output mode, the first clutch is disengaged, the second clutch is engaged, the displacement of the second hydrostatic element is increased in an opposite direction to that of mode one and the displacement of the first hydrostatic element is decreased until all parts of the planetary gear system are rotating at the same speed for a second output mode, the third clutch is disengaged, the fourth clutch is engaged and the displacement of the first hydrostatic element is increased to a maximum and the displacement of the second hydrostatic element is decreased to zero for a third output mode, the second is disengaged, the first clutch is engaged, the displacement of the second hydrostatic element is increased to a maximum in a direction opposite to that of the third mode and the displacement of the first hydrostatic element is decreased to zero for a fourth output mode, and the reverse brake is selectively engaged in the first and second output modes to obtain reverse.

19. An agricultural tractor comprising:

an engine;

drive wheels;

a hydro-mechanical transmission driven by the engine and drivingly coupled to the drive wheels, the hydro-mechanical transmission comprising:
   an input shaft adapted to be connected to the engine;
   an output shaft adapted to be connected to the drive wheels;
   a hydrostatic transmission including:
      a first hydrostatic element;
      a second hydrostatic element in fluid communication with the first hydrostatic element;
   a mechanical transmission having a planetary gear system including:
      a first clutch, a second clutch, a third clutch and a fourth clutch;
      a first element coupled to the input shaft and driven thereby;
      a second element in driving engagement with the first hydrostatic element;
      a third element selectively coupled to the second hydrostatic element by the first clutch;
      a fourth element selectively coupled to the second hydrostatic element by the second clutch, the fourth element drivingly coupled to the second element;
      a fifth element coupled to the output, the fifth element being selectively coupled to the third element by the third clutch, and selectively coupled to the fourth element by the first clutch; and,
      a sixth element selectively coupled to ground by a reverse brake wherein the fifth element and the output shaft are driven in reverse;

whereby the transmission has four forward speed modes and two reverse speed modes for infinitely variable speed adjustment between a full speed reverse and a full speed forward.

20. The agricultural tractor as defined by claim 19 wherein the planetary system has three planetary gear sets.

21. The agricultural tractor as defined by claim 20 wherein first and second planetary gear sets have first and second planet gears respectively which are fixed to one another and thereby rotate together.

22. The agricultural tractor as defined by claim 20 wherein the three planetary gear sets have a common planet gear carrier.

23. The agricultural tractor as defined by claim 22 wherein the planet gear carrier is the third element that is selectively coupled to the second hydrostatic element by the first clutch.

24. The agricultural tractor as defined by claim 22 wherein the three planetary gear sets include first planet gears meshing with a first sun gear, second planet gears meshing with a second sun gear and a first ring gear and wherein the first and second planet gears are fixed to one another and thereby rotate at the same speed.

25. The agricultural tractor as defined by claim 24 wherein the first sun gear is the first element and the first ring gear is the second element.

26. The agricultural tractor as defined by claim 24 wherein a third sun gear is the fifth element and is fixed to the output shaft.

27. The agricultural tractor as defined by claim 26 wherein a second ring gear is the sixth element.

* * * * *